(12) United States Patent
Fang

(10) Patent No.: US 12,217,372 B2
(45) Date of Patent: Feb. 4, 2025

(54) GENERATING MIXED REALITY CONTENT BASED ON DATA FROM A WIRELESS DEVICE

(71) Applicant: T-Mobile USA, Inc., Bellevue, WA (US)

(72) Inventor: Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 110 days.

(21) Appl. No.: 17/968,679

(22) Filed: Oct. 18, 2022

(65) Prior Publication Data

US 2024/0127548 A1 Apr. 18, 2024

Related U.S. Application Data

(60) Provisional application No. 63/416,807, filed on Oct. 17, 2022.

(51) Int. Cl.
| | |
|---|---|
| *G06T 19/00* | (2011.01) |
| *G01S 19/01* | (2010.01) |
| *G02B 27/01* | (2006.01) |
| *G06F 3/0346* | (2013.01) |
| *G06T 13/40* | (2011.01) |
| *G06T 19/20* | (2011.01) |

(52) U.S. Cl.
CPC ............ *G06T 19/006* (2013.01); *G01S 19/01* (2013.01); *G02B 27/0172* (2013.01); *G06F 3/0346* (2013.01); *G06T 13/40* (2013.01); *G06T 19/20* (2013.01); *G06T 2200/24* (2013.01)

(58) Field of Classification Search
CPC .............................. G01S 19/01; G06T 19/006
See application file for complete search history.

(56) References Cited

U.S. PATENT DOCUMENTS

| | | |
|---|---|---|
| 5,774,878 A | 6/1998 | Marshall |
| 6,388,657 B1 | 5/2002 | Natoli |
| 6,600,480 B2 | 7/2003 | Natoli |

(Continued)

FOREIGN PATENT DOCUMENTS

| | | |
|---|---|---|
| CN | 205485929 U | 8/2016 |
| CN | 106228615 A | 12/2016 |

(Continued)

*Primary Examiner* — Shivang I Patel
(74) *Attorney, Agent, or Firm* — Perkins Coie LLP

(57) ABSTRACT

A system associated with a telecommunications network is in communication with a wireless device and an HMD device. The system obtains image data that depicts the wireless device while a user is wearing the HMD device. The wireless device and the HMD device are co-located in an area of the telecommunications network. The system can receive parameter data generated by one or more sensors of the wireless device. The system can generate mixed reality data based on the image data and the parameter data. The mixed reality data includes an immersive view of a computer-generated virtual environment including a virtual image of the wireless device and the virtual image depicts a real-world view of the wireless device and simulates the wireless device based on the parameter data. The system can also cause the HMD device to display the immersive view to the user wearing the HMD device.

19 Claims, 8 Drawing Sheets

(56) References Cited

U.S. PATENT DOCUMENTS

| | | |
|---|---|---|
| 6,630,915 B1 | 10/2003 | Flood |
| 7,046,214 B2 | 5/2006 | Ebersole et al. |
| 7,376,903 B2 | 5/2008 | Morita et al. |
| 8,098,263 B2 | 1/2012 | Noro et al. |
| 8,493,353 B2 | 7/2013 | Blanchflower et al. |
| 8,615,383 B2 | 12/2013 | Dobbins et al. |
| 8,624,924 B2 | 1/2014 | Dobbins et al. |
| 8,922,590 B1 | 12/2014 | Luckett et al. |
| 8,963,956 B2 | 2/2015 | Latta et al. |
| 9,153,195 B2 | 10/2015 | Geisner et al. |
| 9,255,813 B2 | 2/2016 | Liu et al. |
| 9,606,992 B2 | 3/2017 | Geisner et al. |
| 9,645,397 B2 | 5/2017 | Da Veiga et al. |
| 9,710,973 B2 | 7/2017 | Bar-Zeev et al. |
| 9,729,819 B2 | 8/2017 | Im et al. |
| 9,740,010 B2 | 8/2017 | Alhashim |
| 9,746,913 B2 | 8/2017 | Lam et al. |
| 9,767,524 B2 | 9/2017 | Hastings et al. |
| 9,767,720 B2 | 9/2017 | Kinnebrew et al. |
| 9,779,555 B2 | 10/2017 | Chang et al. |
| 9,804,257 B2 | 10/2017 | Pusch et al. |
| 9,804,394 B2 | 10/2017 | Lin et al. |
| 9,818,228 B2 | 11/2017 | Lanier et al. |
| 9,858,720 B2 | 1/2018 | Da Veiga et al. |
| 9,865,089 B2 | 1/2018 | Burns et al. |
| 9,922,463 B2 | 3/2018 | Lanier et al. |
| 9,965,899 B2 | 5/2018 | Khalid et al. |
| 10,102,659 B1 | 10/2018 | Hariton |
| 10,204,456 B2 | 2/2019 | Kudirka et al. |
| 10,409,363 B1 | 9/2019 | Kudirka et al. |
| 10,445,941 B2 | 10/2019 | Niles |
| 10,525,324 B2 | 1/2020 | Kudirka et al. |
| 10,572,000 B2 | 2/2020 | Cossairt et al. |
| 10,646,767 B2 | 5/2020 | Kudirka et al. |
| 10,657,701 B2 | 5/2020 | Osman et al. |
| 10,661,149 B2 | 5/2020 | Kudirka et al. |
| 11,024,064 B2 | 6/2021 | Muhsin et al. |
| 2003/0014212 A1 | 1/2003 | Ralston et al. |
| 2005/0131776 A1 | 6/2005 | Perotti et al. |
| 2006/0038833 A1 | 2/2006 | Mallinson et al. |
| 2006/0176242 A1 | 8/2006 | Jaramaz et al. |
| 2007/0115998 A1 | 5/2007 | McElligott |
| 2008/0030429 A1 | 2/2008 | Hailpern et al. |
| 2010/0208033 A1 | 8/2010 | Edge et al. |
| 2011/0187563 A1 | 8/2011 | Sanders-Reed |
| 2013/0050258 A1 | 2/2013 | Liu et al. |
| 2013/0095924 A1 | 4/2013 | Geisner et al. |
| 2013/0113827 A1 | 5/2013 | Forutanpour et al. |
| 2013/0147687 A1 | 6/2013 | Small et al. |
| 2013/0147836 A1 | 6/2013 | Small et al. |
| 2013/0230832 A1 | 9/2013 | Peters et al. |
| 2014/0002492 A1 | 1/2014 | Lamb et al. |
| 2014/0015858 A1 | 1/2014 | Chiu |
| 2014/0055493 A1 | 2/2014 | Cohen |
| 2015/0271136 A1 | 9/2015 | Farris |
| 2017/0103440 A1 | 4/2017 | Xing et al. |
| 2018/0096519 A1 | 4/2018 | Tokubo |
| 2018/0365898 A1 | 12/2018 | Costa |
| 2019/0096130 A1* | 3/2019 | Shim ............... G06F 3/011 |
| 2019/0130788 A1 | 5/2019 | Seaton |
| 2020/0133618 A1 | 4/2020 | Kim |
| 2020/0258306 A1 | 8/2020 | Forutanpour et al. |
| 2020/0320955 A1 | 10/2020 | Kiser et al. |
| 2021/0379496 A1 | 12/2021 | Dolgan et al. |
| 2022/0005282 A1* | 1/2022 | McCall ............... A63F 13/24 |
| 2022/0187945 A1 | 6/2022 | Kandadai et al. |
| 2023/0065719 A1 | 3/2023 | Bryant et al. |
| 2023/0154113 A1* | 5/2023 | Pratt ............... G06Q 30/016 |
| | | 345/473 |

FOREIGN PATENT DOCUMENTS

| | | |
|---|---|---|
| CN | 206541288 U | 10/2017 |
| CN | 212231547 U | 12/2020 |
| CN | 112215967 A | 1/2021 |
| CN | 113593347 A | 11/2021 |
| EP | 1466300 A1 | 10/2004 |
| EP | 2609568 A2 | 7/2013 |
| EP | 2691937 A1 | 2/2014 |
| EP | 2919094 A1 | 9/2015 |
| EP | 2967322 A1 | 1/2016 |
| EP | 3136372 A1 | 3/2017 |
| EP | 3227862 A1 | 10/2017 |
| EP | 3262624 A1 | 1/2018 |
| EP | 3452192 A1 | 3/2019 |
| EP | 3528090 A1 | 8/2019 |
| EP | 3625658 A1 | 3/2020 |
| EP | 3641308 A1 | 4/2020 |
| EP | 2973512 B1 | 5/2020 |
| EP | 3714602 A1 | 9/2020 |
| EP | 3776405 A1 | 2/2021 |
| JP | 2014187559 A | 10/2014 |
| JP | 7066842 B2 | 5/2022 |
| KR | 101389894 B1 | 4/2014 |
| KR | 102112959 B1 | 5/2020 |
| KR | 102163513 B1 | 10/2020 |
| KR | 102185632 B1 | 12/2020 |
| WO | 2007058428 A1 | 5/2007 |
| WO | 2007133209 A1 | 11/2007 |
| WO | 2013032955 A1 | 3/2013 |
| WO | 2013075054 A1 | 5/2013 |
| WO | 2014204330 A1 | 12/2014 |
| WO | 2016112017 A2 | 7/2016 |
| WO | 2018047202 A1 | 3/2018 |
| WO | 2018122709 A1 | 7/2018 |
| WO | 2018127782 A1 | 7/2018 |
| WO | 2018219336 A1 | 12/2018 |
| WO | 2020086911 A1 | 4/2020 |
| WO | 2021238804 A1 | 12/2021 |

* cited by examiner

GENERATING MIXED REALITY CONTENT BASED ON DATA FROM A WIRELESS DEVICE

CROSS-REFERENCE TO RELATED APPLICATIONS

This application claims the benefit of U.S. Provisional Patent Application No. 63/416,807, filed Oct. 17, 2022, entitled GENERATING MIXED REALITY CONTENT BASED ON DATA FROM A WIRELESS DEVICE OR A LOCATION OF A WIRELESS DEVICE, which is hereby incorporated by reference in its entirety.

BACKGROUND

Mixed reality (MR) refers to a computer-generated environment that merges together physical (i.e., real-world) and digital (i.e., virtual-world) objects and features. The physical and digital objects and features co-exist and interact in real-time. A viewer of MR can see and immerse themselves in the computer-generated environment. For example, a viewer can experience interacting with objects in a virtual environment with her hands or interacting virtually with a real-world physical object. MR can be used to facilitate a metaverse experience. Metaverse refers to a network of three-dimensional virtual worlds allowing social connections and interactions between different users that are located at a distance from each other. MR experiences can be provided by head-mounted display (HMD) devices. HMD devices are configured to be worn on a head of a viewer and include small-sized optical components for displaying computer-generated content in an immersive manner.

BRIEF DESCRIPTION OF THE DRAWINGS

Detailed descriptions of implementations of the present technology will be described and explained through the use of the accompanying drawings.

Figure 1:
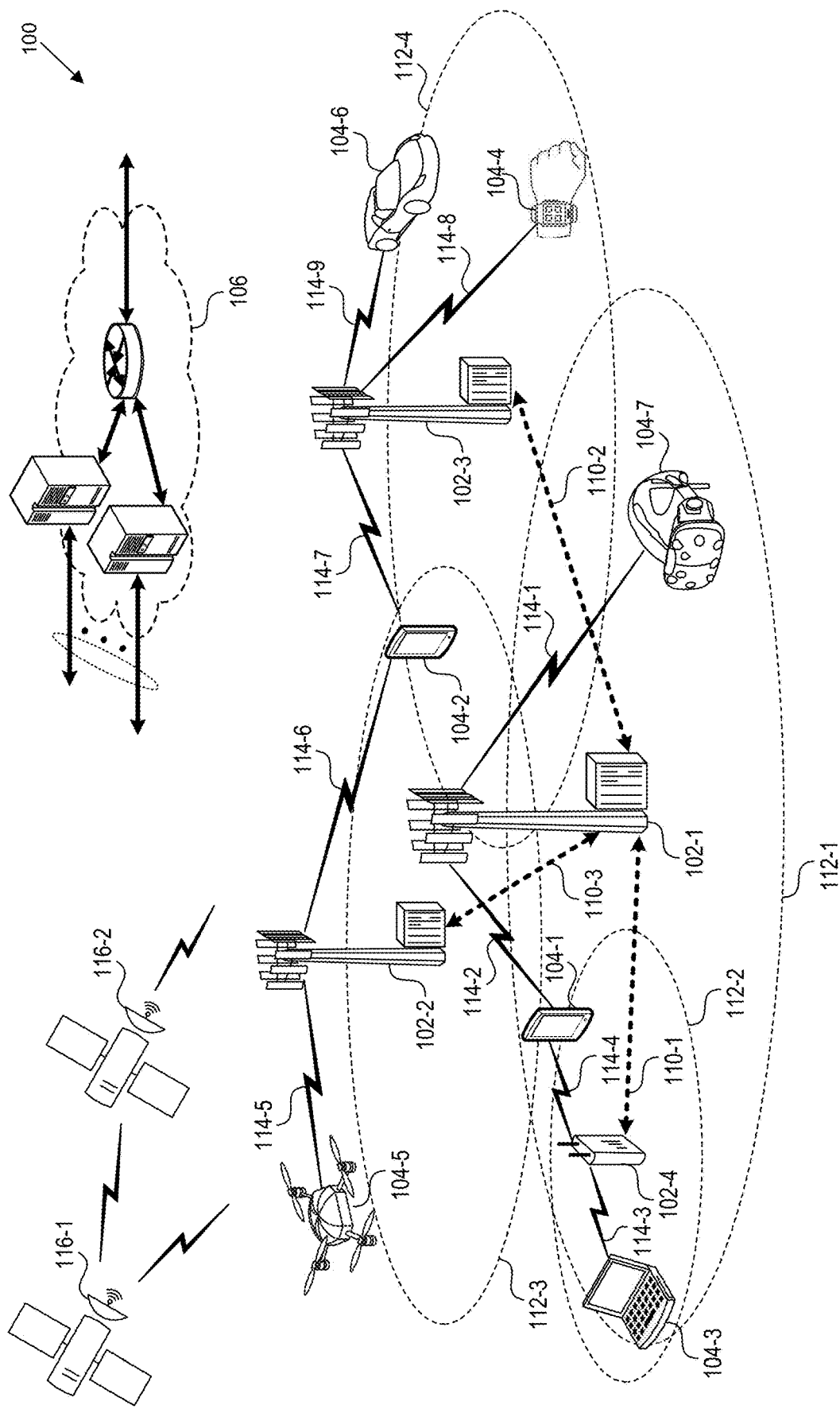
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to generating mixed reality (MR) data to be displayed on an electronic device such as a head-mounted display (HMD) device associated with a system of a telecommunications network. The MR data can be used of providing MR and metaverse experiences to a user. The system is in communication with a wireless device (e.g., a mobile phone) and an HMD device (e.g., a standalone headset). The system can generate MR data to be displayed by the HMD device. The MR data can include a computer-generated virtual environment and an image of the wireless device that represents a real-world image of the wireless device. The MR data can further include a simulation of the wireless device based on, for example, parameter data received from the wireless device and/or image data received from the HMD or the wireless device. For example, changes in the orientation or position of the wireless device or content displayed on the wireless device can be simulated in the MR data based on parameter data received from the wireless device. The wireless device and the HMD can be located in a common location or separate locations. For example, when the wireless device and the HMD device are located in the same location, the generated MR data can be configured to provide an MR experience where the user is interacting with the wireless device in a virtual environment. As another example, when the HMD device is located in a different location than the wireless device, the generated MR data can be configured to virtually teleport the user wearing the HMD device to the location of the wireless device while the user is physically at the different location.

In one example, the disclosed technology includes a system in communication with a wireless device and an HMD device. The system is associated with a telecommunications network. The system can obtain image data that depicts the wireless device while a user is wearing the HMD device. The wireless device and the HMD device can be co-located in an area of the telecommunications network while the user is wearing the HMD device. The system can receive parameter data of the wireless device from the wireless device. The parameter data can be generated by one or more sensors of the wireless device. The system can generate MR data based on the image data and the parameter data. The MR data can include an immersive view of a computer-generated virtual environment including a virtual image of the wireless device and the virtual image depicts a real-world view of the wireless device and simulates the wireless device based on the parameter data. The system can also cause the HMD device to display the immersive view to the user wearing the HMD device based on the MR data.

In another example, a method for generating MR data to be displayed by an HMD device includes obtaining image data that depicts a wireless device while a user is wearing the HMD device. The wireless device and the HMD device can be co-located in an area of a telecommunications network while the user is wearing the HMD device. The method can include generating MR data based on the obtained image data. The MR data can include an immersive view of a computer-generated virtual environment including a virtual image of the wireless device. The virtual image can depict a real-world view of the wireless device. The method can further include causing the HMD device to display the immersive view to the user wearing the HMD device based on the MR data.

In yet another example, a wireless device is in communication with a system associated with a telecommunications network. The wireless device includes one or more sensors. The wireless device can capture parameter data associated with the wireless device by the one or more sensors. The wireless device can send the parameter data to the system. The wireless device thereby can cause the system to generate MR data based partially on the parameter data. The MR data can include an immersive view of a computer-generated virtual environment including a virtual image of the wireless device. The virtual image depicts a real-world view of the wireless device and simulates the wireless device based on the parameter data. The wireless device can stream the MR data to a head-mounted display (HMD) device which is configured to present the immersive view to a user of the wireless device. The HMD device can simulate a real-world view of the wireless device in the immersive view of the computer-generated virtual environment and have a motion based on the motion data associated with the wireless device.

In yet another example, the disclosed technology includes a system in communication with a wireless device and an HMD device. The system is associated with a telecommunications network. The system can determine a first location of the wireless device on the telecommunications network and a second location of the HMD device communicatively coupled to the telecommunications network. The system can receive parameter data of the wireless device from the wireless device. The parameter data can be generated by one or more sensors of the wireless device. The system can generate mixed reality data based the first location or a relative location of the wireless device and the parameter data. The relative location can correspond to the first location of the wireless device relative to the second location of the HMD device. The mixed reality data can anchor a virtual object to a real-world object at the first location of the wireless device and simulates the wireless device based on the parameter data. The system can cause the HMD device to display an immersive view to a user wearing the HMD device based on the mixed reality data while the wireless device is in the first location and the HMD device is in the second location.

In yet another example, a method for generating mixed reality data to be displayed by a head-mounted display (HMD) device can include determining a first location of a wireless device communicatively coupled to a telecommunications network and a second location of the HMD device communicatively coupled to the telecommunications network. The method can include receiving parameter data of the wireless device from the wireless device. The parameter data can be generated by one or more sensors of the wireless device. The method can include generating mixed reality data based on the parameter data. The mixed reality data can anchor a virtual object to a real-world object at the first location of the wireless device. The method can include causing the HMD device to display an immersive view to a user wearing the HMD device based on the mixed reality data while the wireless device is in the first location and the HMD device is in the second location.

In yet another example, a wireless device is in communication with a system associated with a telecommunications network and a head-mounted display (HMD) device, the wireless device comprising. The wireless device can transmit location data indicating a first location of the wireless device to the system. The HMD device can be located at a second location. The wireless device can capture parameter data associated with the wireless device by the one or more sensors and send the parameter data to the system. The wireless device can cause the system to generate mixed reality data based the first location or a relative location of the wireless device and the parameter data. The relative location can correspond to the first location of the wireless device relative to the second location of the HMD device. The mixed reality data can anchor a virtual object to a real-world object at the first location of the wireless device and simulates the wireless device based on the parameter data. The wireless device can cause the HMD device to display an immersive view to a user wearing the HMD device based on the mixed reality data while the wireless device is in the first location and the HMD device is in the second location.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (M IMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Methods and Systems for Generating MR Data

Figure 2:
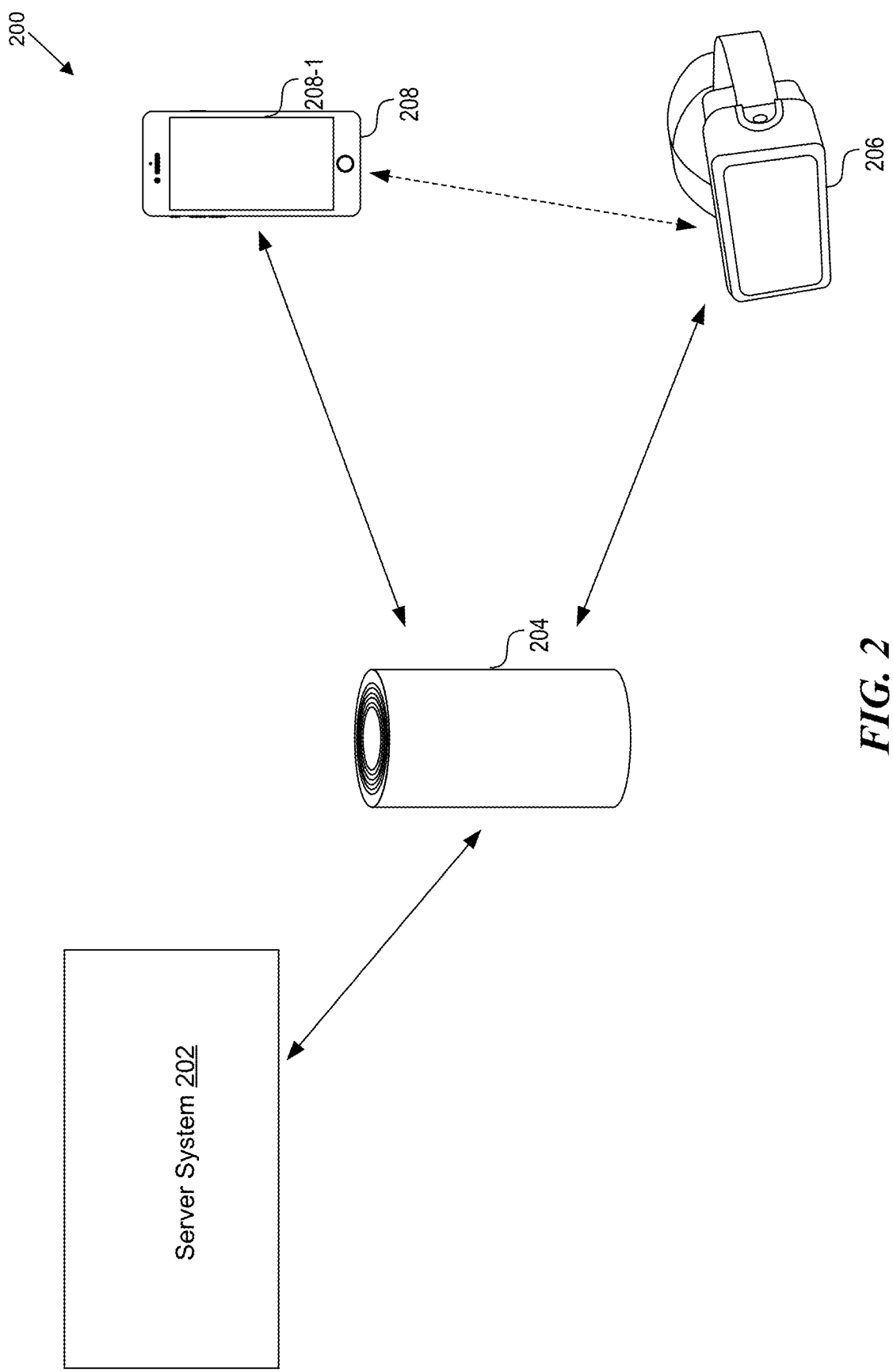
FIG. 2 is a block diagram that illustrates a system for generating and displaying MR data.

FIG. 2 is a block diagram that illustrates a system 200 for generating and displaying MR data. The system 200 includes a server system 202 that is associated with a telecommunications network. The system 200 also includes a wireless device 208 and an HMD device 206 that are in communication with the server system 202 via a base station 204 of the telecommunications network. The server system 202 is configured to communicate data to and from the wireless device 208 and the HMD device 206 through a wireless connection facilitated by the telecommunications network. Additionally, the HMD device 206 and the wireless device 208 can be configured to communicate data with each other through a such wireless connection. The communication can be, for example, via a Wi-Fi connection, Bluetooth or Bluetooth Low Energy (BLE) connection, Ethernet connection, cable connection, digital subscriber line (DSL) connection, cellular connection (e.g., 3G, LTE/4G, 5G or 6G), or the like, or a combination thereof. The wireless device 208 and the HMD device 206 can also be in communication with each other (e.g., via Wi-Fi and/or Bluetooth or BLE connection). The data can be any kind of data, such as image data (e.g., still images and/or full-motion video, including 2D and 3D images), sensor data, audio, multimedia, voice, and/or any other type(s) of data.

In some implementations, the wireless device 208 can be a mobile phone, a tablet computer, a laptop computer, a smart watch, or any other wireless device. The wireless device 208 can include a display (e.g., a display 208-1 such as a touch-sensitive display) that is configured to display content (e.g., graphical user interfaces (GUIs)) on a display as well as output audio content (e.g., via speakers). The HMD device 206 can include a near-to-eye display system that can include one or more displays and optical components for displaying computer-generated content in an immersive manner. The HMD device 206 can also include one or more audio input and output devices (e.g., one or more microphones and one or more speakers). The HMD device 206 can include components such as light-emission elements (e.g., light-emitting diodes (LEDs)), waveguides, and processing electronics. HMD devices can further include one or more imager devices to generate images (e.g., stereo pair images for 3D vision) in accordance with the environment of a user wearing the HMD device, based on measurements and calculations determined from the components included in the HMD device. The HMD device 206 can also include a depth-sensing system that resolves the distance between the HMD device worn by a user and the physical surfaces of objects in the user's immediate vicinity (e.g., walls, furniture, people, and other objects). The HMD device 206 can be a standalone device that is capable of without the need of another device or computer.

In some implementations, the wireless device 208 and the HMD device 206 include one or more cameras configured to capture image data that depicts objects and the environment surrounding the respective devices. In some implementations, the wireless device 208 and the HMD device 206 can include various sensors that can generate parameter data associated with the respective device. The wireless device 208 and the HMD device 206 can transmit the captured image data and/or the generated parameter data to the server system 202 which can use the parameter data for the generation of MR data. The parameter data can be indicative of the movement and/or orientation of the respective device. The various sensors can be configured to detect its movement and/or orientation via various sensors, such as an accelerometer sensor, an orientation sensor, a light sensor, a Global Positioning System (GPS) sensor, and a gyroscope. The wireless device 208 can also be configured to receive user input such as touch input (e.g., via a fingerprint sensor or a touch-sensitive display) or audio input (e.g., via a microphone) that the wireless device can use for generating parameter data. Such parameter data is indicative of user inputs received by the wireless device 208. For example, a user can provide an input (e.g., tap an affordance) on a touch-sensitive display of the wireless device 208 while the touch-sensitive display is displaying a particular GUI. The wireless device 208 can transmit an indication of such user input as parameter data to the server system 202. The wireless device 208 can also transmit application data to the server system 202. The application data is indicative of content (e.g., a GUI) displayed on the display of the wireless device 208. For example, the wireless device 208 can transmit application data that describes a GUI that is currently displayed on the wireless device.

The wireless device 208 and the HMD device 206 can be co-located in an area of the telecommunications network so that the wireless device 208 and the HMD device 206 communicate with the server system 202 via the common base station 204, as shown in FIG. 2. For example, the wireless device 208 is positioned near a user who is wearing the HMD device 206. The user can be experiencing MR via the HMD device 206 while holding the wireless device 208 in her hand or while the wireless device 208 is positioned within the field of view of the user experiencing the MR.

The server system 202 is configured to generate MR data based on the image data and/or the parameter data received from the wireless device 208 and/or the HMD device 206. The generated MR data can be transmitted to the HMD device 206 for display. The generated MR data includes a combination of features depicting real-world objects and features and virtual objects and features. For example, the generated MR data can include an immersive view of a virtual environment that includes a virtual image of the wireless device 208 that is positioned in the vicinity of the HMD device 206. The generated MR data is configured to be displayed as an immersive computer-generated MR view to the user wearing the HMD device 206.

Figure 3:
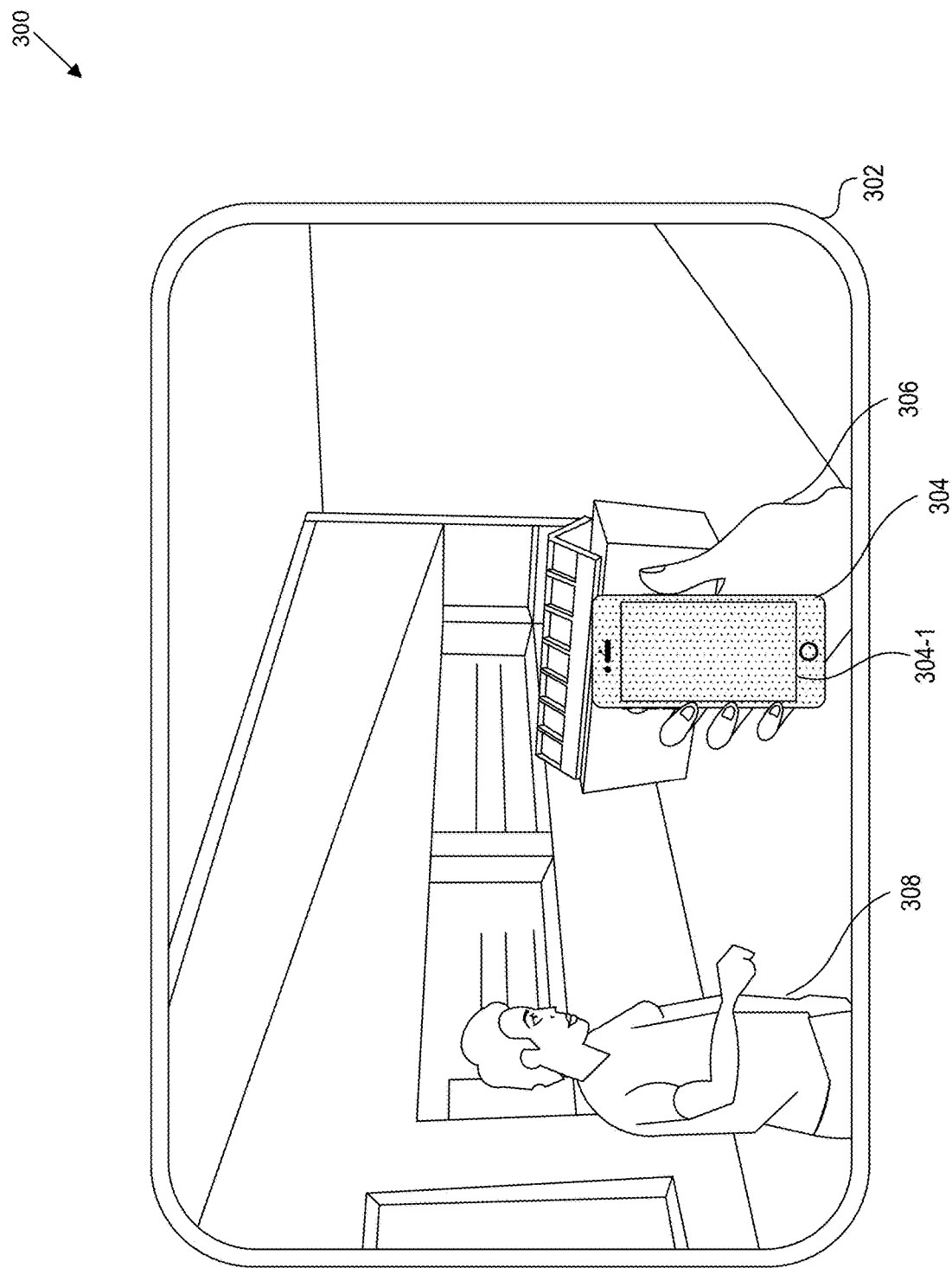
FIG. 3 illustrates an exemplary schematic illustration of an immersive MR view displayed on an HMD.

FIG. 3 illustrates an exemplary schematic illustration of an immersive MR view 300 displayed on an HMD. The MR view 300 is displayed on a display (e.g., display 302) of an HMD device (e.g., the HMD device 206). The MR view 300 includes a three-dimensional environment that provides the user of the HMD device with an immersive experience of being within the three-dimensional environment. The MR view 300 changes as the position or orientation of the HMD device changes. For example, as the user changes the gaze direction (e.g., by turning the head or rotating the eyes) or position (e.g., turning the body or changing position by moving forward, backward, or sideways), the MR view 300 changes to correspond to the current gaze direction and position accordingly. For example, when the user turns the head toward the right, the MR view 300 changes represent The MR view 300 is generated by a server system (e.g., the server system 202 in FIG. 2) based on image data, parameter data, and/or application data received from a wireless device (e.g., the wireless device 208) and/or the HMD device. The MR view 300 is received by the user wearing the HMD device while holding a wireless device (e.g., the wireless device 208) in the hand. The MR view 300 includes a virtual (e.g., fully computer-generated) environment that represents a room (e.g., a store). The MR view 300 also includes a virtual image 304 of a wireless device that is being held by a hand 306 of a user. The virtual image 304 of the wireless device includes a display (e.g., display 304-1) that is configured to display content (e.g., GUIs). The virtual images 304 of the wireless device and the hand 306 depict the real-world, real-time views of the wireless device and the hand of the user. In FIG. 3, the virtual image 304 of the wireless device is illustrated with a pattern while the virtual environment is illustrated with a solid color to emphasize that the virtual image of the virtual image 304 of the wireless device depicts and simulates a real-world object while the environment is computer-generated (e.g., not based on image data of a real-world environment).

In some implementations, the MR view 300 can also include one or more avatars (e.g., an avatar 308). An avatar refers to an interactive character in a virtual world that can be configured to interact with a virtual environment and a user experiencing the virtual world. The avatar 308 can be configured to move across the virtual environment, interact with the virtual image 304 of the wireless device (e.g., provide virtual inputs), provide audio outputs (e.g., talk), and perform virtual tasks that represent real-world tasks. The avatar 308 can interact with the user wearing the HMD device by audio communication. For example, the avatar 308 can have an audio conversation with the user. As another example, the avatar 308 can interact with the virtual image 304 of the wireless device by providing a touch input on a touch-sensitive display of the wireless device (e.g., display 208-1 of wireless device 208 in FIG. 2).

Figure 4:
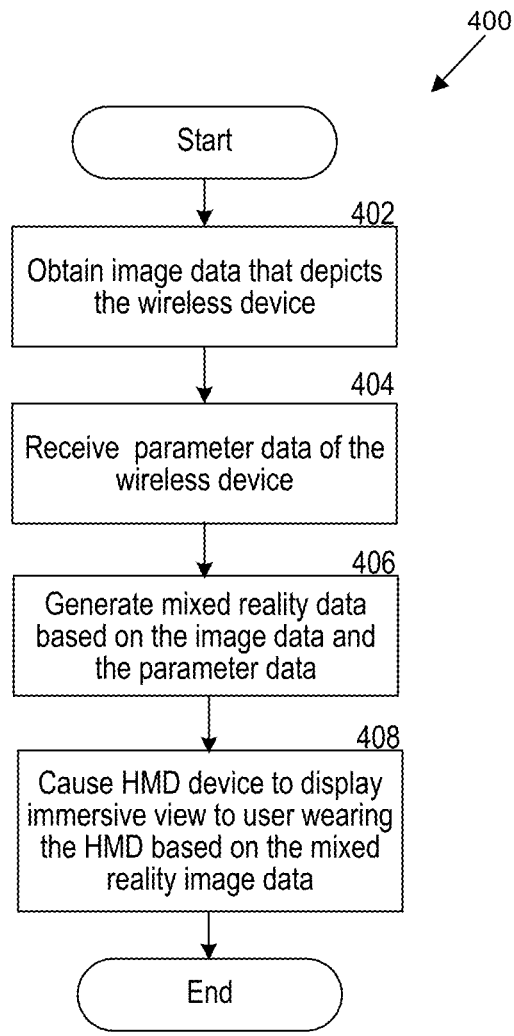
FIG. 4 is a block diagram that illustrates processes for generating MR data.

FIG. 4 is a block diagram that illustrates processes 400 for generating MR data. The processes 400 can be performed at a server system (e.g., the server system 202 in FIG. 2). The server system can be associated with a telecommunications network. The server system is in communication with a wireless device and a head-mounted display (HMD) device (e.g., the wireless device 208 and the HMD device 206 in FIG. 2). For example, the server system is in communication with the wireless device and the HMD device via a common base station (e.g., the base station 204) associated with the telecommunications network. The server system can include at least one hardware processor and at least one non-transitory memory storing instructions. In one example, the server system corresponds to a computer system 800 described with respect to FIG. 8. When the instructions are executed by the at least one hardware processor, the server system performs the processes 400.

At 402, the server system can obtain image data that depicts the wireless device while a user is wearing the HMD device, and the wireless device and the HMD device and be co-located in an area of the telecommunications network while the user is wearing (e.g., using) the HMD device. The wireless device can be, for example, in the vicinity of the wireless device or the user wearing the HMD device is holding the wireless device in her hand.

In some implementations, obtaining the image data that depicts the wireless device can include receiving a real-world image of the wireless device that is captured by an image sensor (e.g., a camera) of the HMD device that the HMD device has then transmitted to the server system. For example, as described above, the HMD device can include one or more cameras that are configured to capture images of objects and the environment surrounding the HMD device. The HMD device can thereby capture images that include the wireless device that is positioned in the vicinity of the HMD device. The real-world image of the wireless device depicts the position and orientation of the wireless device with respect to the HMD device and/or the user. The real-world image of the wireless device can also depict content displayed by the wireless device on its display. For example, when the wireless device is displaying a particular GUI associated with a particular application, the real-world image of the wireless device can depict the particular GUI displayed on the display of the wireless device. In some embodiments, obtaining the image data that depicts the wireless device can include receiving a real-world image of the wireless device that is captured by a camera of the HMD device that the wireless device has then transmitted to the server system. Alternatively or additionally, the image data can include a real-world image of the wireless device that is captured by an image sensor that is distinct from the HMD device. Such sensor can be located, for example, in a room where the wireless device and the HMD device are located in.

In some implementations, obtaining the image data can include processing data about the wireless device that can be used to simulate an image of the device. The data can include template image data (e.g., iPhone template image data or Samsung Galaxy template image data) that is associated with the type of the wireless device to simulate an image of the wireless device. For example, the template image data can depict the looks of different GUIs associated with a particular wireless device and the server system can process the template image data to obtain the image data that includes depicts the look of the wireless device displaying the different GUIs. The different GUIs can include, for example, an application launch GUI, a sleep mode GUI, an application GUI (e.g., email application, messaging application, call application, camera application, calendar application, and map application), notification GUI, and/or standby GUI.

In some implementations, obtaining the image data that depicts the wireless device can include receiving application data from the wireless device. The application data is indicative of content displayed on the wireless device. For example, when the wireless device is displaying the particular GUI associated with the particular application (e.g., a calendar GUI), application data received from the wireless device can include an indication of the particular GUI. The indication can include detailed information on features displayed, such as icons, affordances, images, text, and symbols as well as positions and configurations of such features on the display. In some implementations, the application data can be combined with the template image data to simulate the particular GUI associated with the particular application that is displayed on the wireless device.

At 404, the server system can receive parameter data of the wireless device from the wireless device. The parameter data can be generated by one or more sensors of the wireless device. In some implementations, the one or more sensors are selected from a group consisting of an accelerometer sensor, an orientation sensor (e.g., a geomagnetic orientation sensor), a light sensor, a fingerprint sensor, a Global Positioning System (GPS) sensor, a gyroscope, a microscope, and a touchscreen sensor. The parameter data can include orientation data generated by an orientation sensor or the gyroscope of the wireless device. The orientation data can indicate an absolute orientation of the wireless device or relative changes in the orientation of the wireless device (e.g., changes in angular velocity). The parameter data can also include movement data generated by an accelerometer sensor or position data generated by a GPD sensor. The parameter can also include data related to the environment surrounding the wireless device. For example, data from a light sensor of the wireless device can be used to indicate the weather (e.g., sunny vs. cloudy) or time of day (e.g., midday vs. dawn or dusk), or location (e.g., indoor vs. outdoor lighting). The parameter data can further include user input data generated by a microphone, a fingerprint sensor, or a touchscreen sensor. The input data can indicate that a user has provided a touch input (e.g., a finger tap, press, or swipe) or a voice input on the wireless device.

In some implementations, the server system can generate the image data based on the parameter data of the wireless device and the application data of the wireless device. The parameter data can indicate orientation data generated by an orientation sensor of the wireless device or movement data generated by an accelerometer sensor of the wireless device while the application data can indicate the content displayed on the wireless device.

At 406, the server system can generate MR data based on the image data and the parameter data. The MR data can include MR image data. The MR data includes an immersive view of a computer-generated virtual environment including a virtual image of the wireless device (e.g., the MR view 300 including the virtual image 304 of the wireless device in FIG. 3). The virtual image can depict a real-world view of the wireless device and simulate the wireless device based on the parameter data. At 408, the server system can cause the HMD device to display the immersive view to the user wearing the HMD device based on the MR data. For example, the HMD device can display the immersive as a continuous stream while the user is wearing the HMD device. The MR data can be streamed to the HMD device by the server system either directly or via the wireless device (e.g., via a Bluetooth or Wi-Fi communication between the HMD device and the wireless device).

For example, the user is holding a wireless device (e.g., the wireless device 208 in communication with the server system 202) in her hand while the user is wearing an HMD device (e.g., the HMD device 206 in communication with the server system 202). The HMD device can capture image data that depicts the wireless device and the user's hand and transmits the image data to the server system. The wireless device can generate parameter data that indicates the position and orientation of the wireless device and transmits the parameter data to the server system. The server system can then generate MR data based on the image data and the parameter data. The MR data can include an immersive view of a virtual environment, such as the environment shown in FIG. 3. The MR data can include a virtual image of the wireless device (e.g., the virtual image 304 of the wireless device) that depicts the real-world image of the wireless device and optionally the hand captured by the HMD device. The server system can transmit (e.g., stream) the MR data to the HMD to be displayed. As the user changes the position or orientation of the phone, updated parameter data and/or image data can be received by the server system. The server system thereby continuously iterates the generation of the MR data accordingly and transmits the iterated MR data to the HMD device to be displayed.

In some implementations, the generated MR data includes a combination of the image data and audio data. For example, the parameter data can include audio content captured by the microphone of the wireless device (e.g., sounds captured from the environment surrounding the wireless device or audio content output by the wireless device (e.g., music)). The generated MR data can depict the real-world, real-time sounds included in the parameter data transmitted by the wireless device.

Generating the MR data and transmitting the MR data to the HMD device for display is done in real-time so that real-world events (e.g., movement of the wireless device) are streamed as MR view to the user in real-time. For example, the server system can continuously generate MR data that tracks the orientation, or movement of the wireless device based on the orientation data or the movement data. Similarly, the server system can continuously generate MR data that tracks the content (e.g., the GUI) displayed on the wireless device based on the application data.

In some implementations, the MR data can include avatar data configured to generate an avatar (e.g., the avatar 308 in FIG. 3) that virtually communicates with the user wearing the HMD device. The avatar can be configured to, for example, interact with the user as well as the wireless device. The server system can generate voice audio data that simulates oral communication from the avatar to the user wearing the HMD device. The server system can transmit the generated voice audio to the HMD device for output. The HMD device can simulate the oral communication form the avatar based on the voice audio data to the user wearing the HMD device. For example, the server system can generate and transmit MR data that includes an avatar together with audio data to the HMD device. The audio data can include a sentence to be communicated to the to her user (e.g., "Hello, how can I help you?"). The HMD device displays the avatar in the immersive view and concurrently outputs the audio data through a speaker to the user wearing the HMD device.

In some implementations, the server system can be further caused to receive audio data including a first oral communication as a user input to the wireless device or the HMD device. The first oral communication is captured by a microphone of the wireless device or the HMD device and the audio data can be received from the wireless device or from the HMD device. The server system can generate a second oral communication (e.g., based on natural language recognition and artificial intelligence) in response to the first oral communication and transmit the second oral communication to the HMD device to simulate a natural conversation with the user wearing the HMD device based on the second oral communication. The avatar can therefore be configured to have a conversation with the user of the HMD device that resembles a natural, real-world conversation. For example, the server system receives audio data generated by a microphone of the wireless device or the HMD device indicating that the user of the HMD device has provided an audio user input (e.g., the user has said "Hello Avatar!"). The server system then generates a responsive communication to the audio user input (e.g., the avatar says "Hello User!") and transmits the responsive communication to the HMD device that outputs it further to the user.

In some implementations, the avatar can simulate communication with the user wearing the HMD device that includes providing a virtual on the virtual image of the wireless device. The server system can send a command to the wireless device that causes the wireless device to perform a particular action. The server system can concurrently change the MR data to simulate that the avatar of the MR data is providing a virtual input on the virtual image of the wireless device that causes the particular action on the wireless device. As used herein, a virtual input thereby can refer to a user input provided in the immersive view on a virtual image depicting a real-world wireless device. The virtual input can be provided by an avatar or by a user. Concurrently with the virtual input, the server system can cause the wireless device to perform a real-world operation based on the virtual input.

For example, the MR data can simulate that the avatar is providing a virtual input (e.g., a virtual finger tab) on an application launch icon (e.g., a calendar application) displayed on the virtual image of the wireless device. In response to the virtual input, the MR data can be updated to display a GUI associated with the application (e.g., a calendar GUI). Concurrently, the server system can send a command to the wireless device that causes the wireless device to launch the corresponding GUI associated with the application on the wireless device. The user thereby experiences an MR interaction with the avatar that can include the avatar providing a virtual input on the virtual image of the wireless device which is then followed by a real-world operation occurring on the wireless device.

In some implementations, the server system can receive the image data from the wireless device including an indication of a user input on the wireless device which has caused the wireless device to display a GUI on the wireless device. In response to receiving the indication, the server system can update the virtual image of the wireless device in the MR data to simulate the GUI in the immersive view. For example, the user provides a touch input on an application launch icon included on a GUI displayed on the wireless device. In response to the touch input, the wireless device can display an application GUI associated with the application launch icon. Concurrently, the server system can update the virtual image of the wireless device in the MR data to simulate the application GUI being displayed on the virtual image of the wireless device.

In some implementations, the server system can stream the MR data to the HMD device through the wireless device. For example, the HMD device and the wireless device can transmit data between each other wirelessly (e.g., via Wi-fi or Bluetooth connection).

In some implementations, the server system can be configured to provide an MR and/or metaverse customer service experience to the user. For example, the computer-generated virtual environment corresponds to a retail store of a network operator associated with the telecommunications network. The MR data can further include avatar data configured to generate an avatar that virtually communicates with the user wearing the HMD device. The avatar can represent a customer service representative of the retail store.

As an example, the user can be a subscriber of the telecommunications network that is associated with the server system. The user may wish to upgrade her service plan to include additional services. Instead of visiting a physical store, the user puts on the HMD device and launches an application associated with the telecommunications network. In response to launching the application, the server system can provide the user with an immersive computer-generated view of a store that resembles the physical stores of the telecommunications network. In the computer-generated view, an avatar representing a customer service representative greets the user and the avatar can communicate to upgrade the user's service plan. The interaction can include, for example, the avatar illustrating to the user, by virtual inputs, how to use some of the new features associated with the upgraded service plan on the user's mobile phone. The server system thereby enables the user to have an MR customer service experience.

Figure 5:
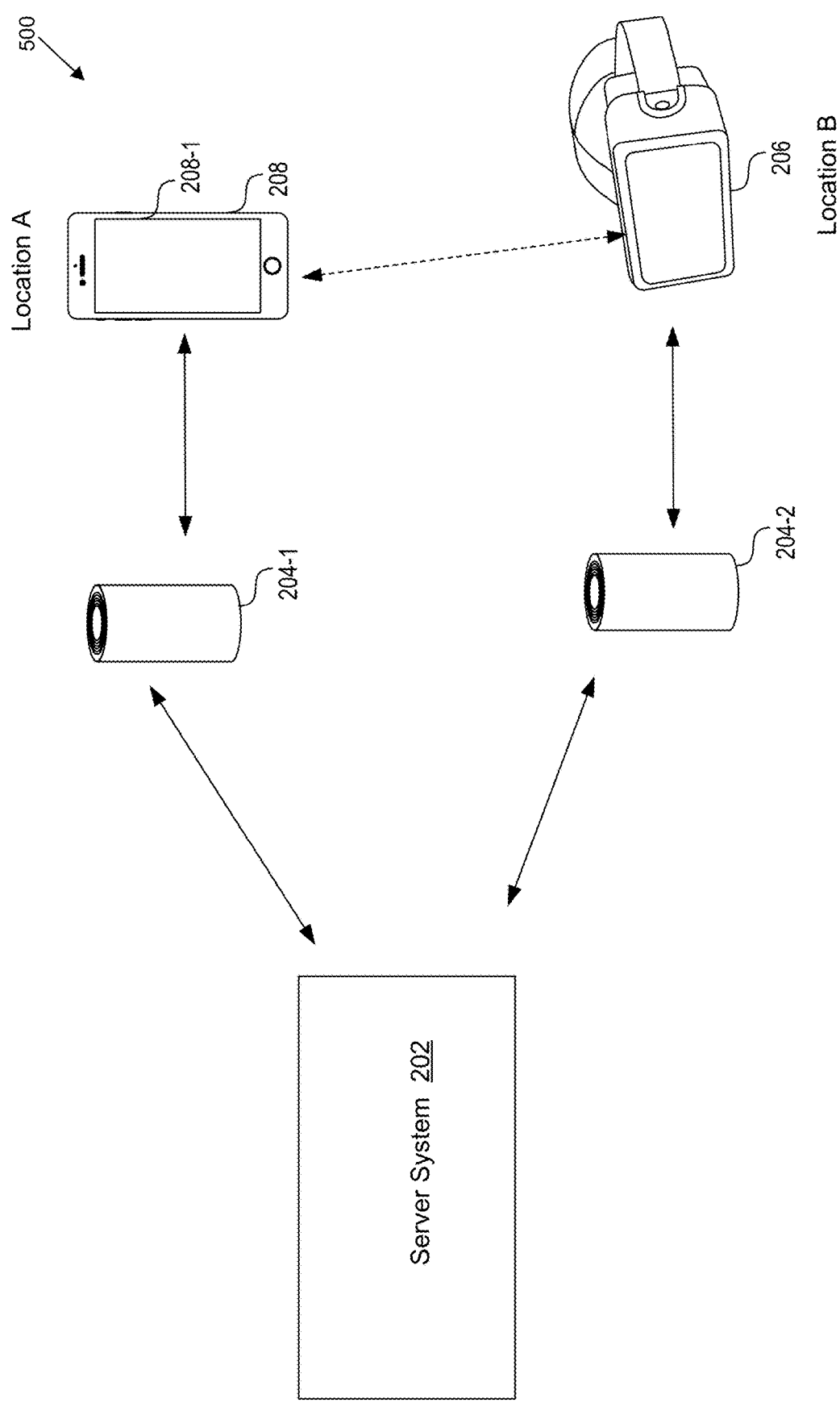
FIG. 5 is a block diagram that illustrates a system for generating and displaying MR data.

FIG. 5 is a block diagram that illustrates a system 500 for generating and displaying MR data. The system 500 includes the server system 202, the wireless device 208, and the HMD device 206 described with respect to FIG. 2. The system 500 can correspond to the system 200 described with respect to FIG. 2 except that in system 500, the wireless device 208 and the HMD device 206 are located at a distance from each other. For example, the wireless device 208 can be located at location A while the HMD device 206 is located at location B. The location A and location B are different from each other and are within a distance from each other. Generally, being within a distance may infer that the wireless device is not within the reach of the user of the HMD device For example, the location A and B can correspond to different rooms of a building or different buildings of a city. The location A and B can be even further away such as in different cities, states, or countries. As shown, the wireless device 208 is in communication with the server system 202 via a base station 204-1, and the HMD device 206 is in communication with the server system 202 via a base station 204-2 that is separate from the base station 204-1.

Figure 6:
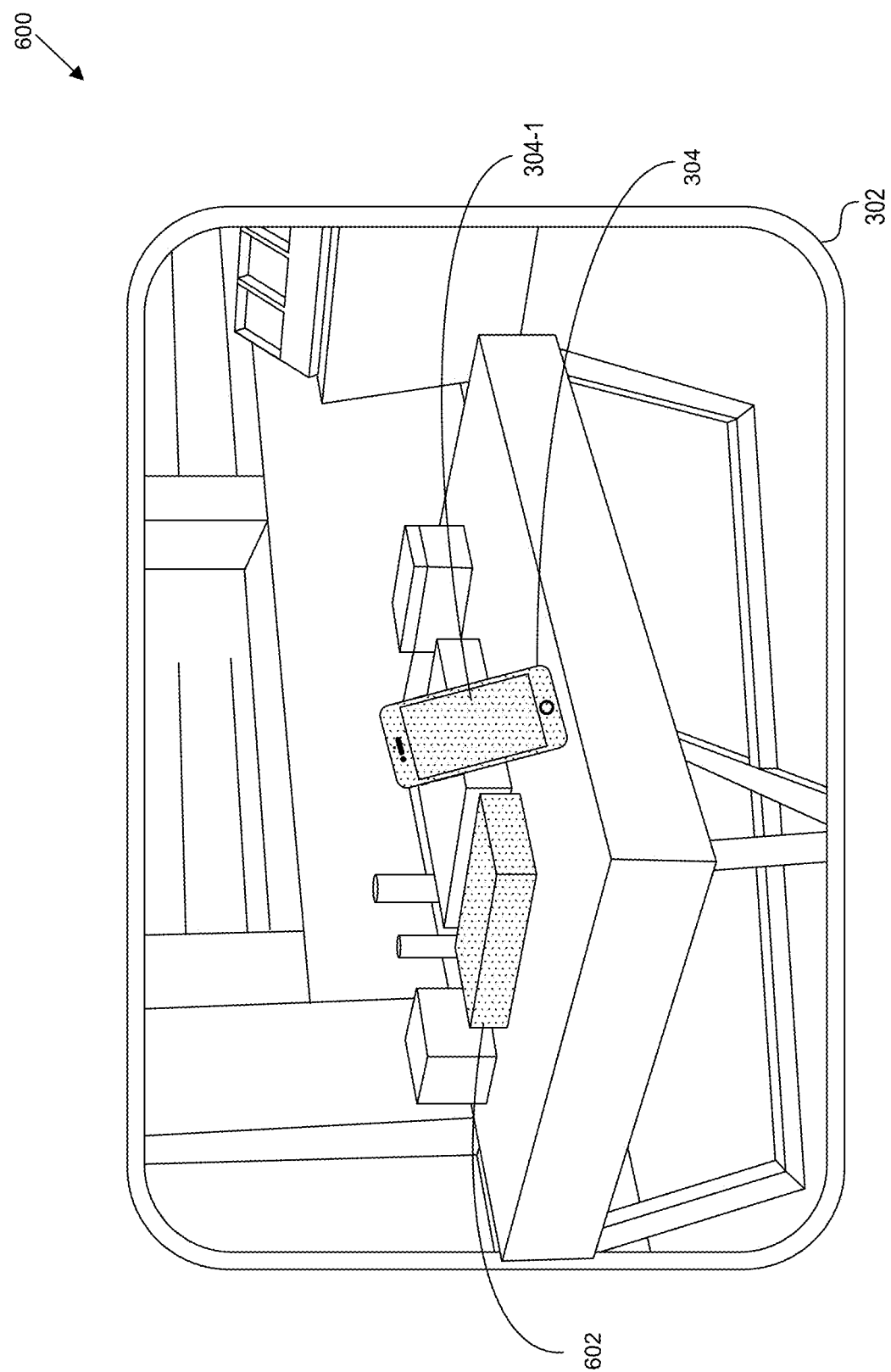
FIG. 6 illustrates an exemplary schematic illustration of an immersive MR view displayed on an HMD.

FIG. 6 illustrates an exemplary schematic illustration of an immersive MR view 600 displayed on an HMD. The MR view 600 is displayed on a display (e.g., the display 302) of an HMD device (e.g., the HMD device 206). The MR view 600 can include similar features to those described with respect to the MR view 300 in FIG. 3. For example, the MR view 600 can include a virtual (e.g., fully computer-generated) environment that represents a room (e.g., a store) and the MR view 600 is configured to change as the position or orientation of the HMD device changes to provide an immersive experience. As another example, the MR view 600 can also include one or more avatars (e.g., the avatar 308 in FIG. 3) that are configured to interact with the user of the HMD device. However, the MR view 600 is distinct from the MR view 300 in that the MR view 600 includes a virtual image 304 of the wireless device that is physically located in a different location than the user wearing the HMD device. The virtual image 304 of the wireless device can depict the real-world, real-time views of the wireless device (e.g., as illustrated with the patterned filling). For example, the wireless device is at the location A and the HMD device is at location B, as shown in FIG. 5. The MR view 600 can thereby correspond to an instance where the user of the HMD device has teleported herself to be virtually in the same location as the wireless device. Teleportation (e.g., metaverse teleportation) refers to experiencing an act of a user to move from a first location to a second location virtually while remaining physical at the first location. By teleporting a user can experience a virtual environment of the second location while wearing the HMD device.

In some implementations, the MR view 600 can include one or more virtual images of objects (e.g., a virtual image 602 of an object) that depict the real-world, real-time view of that object in the first location. Such one or more virtual images can be included in the MR view 600 in addition to the virtual image 304 of the wireless device or instead of the virtual image 304 of the wireless device. For example, the wireless device 208 of FIG. 5 can capture image data of its surroundings when located at location A. The wireless device 208 can transmit that image data to the server system 202 which generates MR data based on the image data. The MR data can include one or more objects depicted in the image data captured by the wireless device 208 that are located in the surroundings of the wireless device 208. Alternatively or additionally, the image data can be captured by another imaging device at the location A. For example, a camera can be positioned in the room where the wireless device 208 is positioned at. The camera can be in communication with the server system 202 and/or the wireless device 208 so that the image data can be transmitted from the camera to the server system 202.

Figure 7:
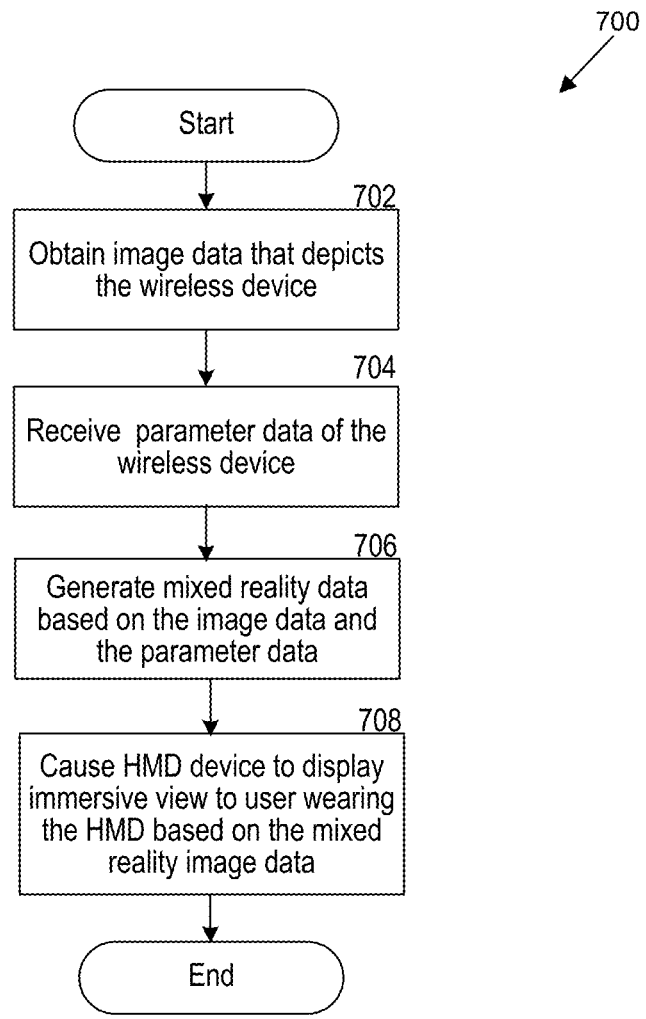
FIG. 7 is a block diagram that illustrates processes for generating MR data.

FIG. 7 is a block diagram that illustrates processes 700 for generating MR data. The processes 700 can be performed at a server system (e.g., the server system 202 in FIG. 5). The server system can be associated with a telecommunications network. The system is in communication with a wireless device and a head-mounted display (HMD) device (e.g., the wireless device 208 and the HMD device 206 in FIG. 5). For example, the server system is in communication with the wireless device and the HMD device via different base stations (e.g., the base stations 204-1 and 204-2) associated with the telecommunications network while the wireless device and the HMD device are located at different locations that have a distance between them (e.g., in different rooms, different buildings, or different cities). The server system can include at least one hardware processor and at least one non-transitory memory storing instructions. In one example, the server system corresponds to the computer system 800 described with respect to FIG. 8. When the instructions are executed by the at least one hardware processor, the server system performs the processes 700.

At 702, the server system can determine a first location of the wireless device on the telecommunications network and a second location of the HMD device. The HMD device can be communicatively coupled to the telecommunications network. Determining the location information can be done at a beginning of a session. The session can begin, for example, when the user puts on the HMD device and launches an application that is associated with the server system to initiate an MR viewing session. Determining the locations can further be performed continuously or at certain intervals (e.g. every one minute, every 15 minutes, or every 30 minutes) after the beginning of the session.

The server system can determine the locations based on location tracking information received from the wireless device and the HMD device. The wireless device and/or the HMD device can transmit the location tracking information to the server system so that the server system determines the locations of the respective devices based on the location tracking information. For example, the first location is determined based on a first global positioning system (GPS) signal received from the wireless device and/or the second location is determined based on a second GPS signal received from the HMD device.

The server system can also determine the locations based on the locations of the base stations that the devices use to communicate with the telecommunications network. For example, the server system can be in communication with the wireless device via a first base station of the telecommunications network and with the HMD device via a second base station of the telecommunications network, so that the first base station is different and separate from the second base station. The server system can thereby determine the location of the wireless device based on the location of the first base station (e.g., the location A of the wireless device 208 is determined based on the base station 204-1 in FIG. 5) and the location of the HMD device based on the location of the second base station (e.g., the location A of the wireless device 208 is determined based on the base station 204-1 in FIG. 5). In instances where the wireless device and the HMD are in communication with a common base station (e.g., the wireless device 208 and the HMD device 206 are in communication via the base station 204 in FIG. 2) of the telecommunications network, determining the first location and the second location can include deriving an inference that the first location corresponds to the second location based on the common base station of the telecommunications network.

In some implementations, the locations can be determined based on a user input received from users operating the wireless device and/or the HMD device. The user wearing the HMD device can be different than the user operating the wireless device. For example, when the first location of the wireless device is a space associated with the telecommunications network (e.g., a store associated with the telecommunications network), the first location can be determined based on an input received from a representative of the telecommunications network who is operating the phone in the first location. The second location can be determined based on an input from the user wearing the HMD device at the second location.

At 704, the server system receives parameter data of the wireless device. For example, the wireless device transmits the parameter data to the server system. The parameter data can be generated by one or more sensors of the wireless device, as described with respect to FIGS. 2-4.

In some implementations, the server system can receive real-time, real-world image data captured by a camera of the wireless device from the wireless device, as described with respect to FIGS. 2 and 4. The image data can depict objects and/or the environment surrounding the wireless device at the first location. The wireless device can transmit the image data to the server system. Alternatively or additionally, the server system can receive the real-time, real-world image data captured by another imaging device at the first location, as described with respect to FIG. 6. For example, a camera can be in communication with the server system 202 and/or the wireless device 208 so that the image data can be transmitted from the camera to the server system 202.

At 706, the server system can generate MR data based the first location or a relative location of the wireless device and the parameter data. The relative location of the wireless device can correspond to the first location of the wireless device relative to the second location of the HMD device. For example, in an instance where the wireless device and the HMD device are located in the same room but at different positions in the room, the generated MR data can include a virtual image of the wireless device that correlates with the relative position of the wireless device with respect to the HMD device.

In some implementations, the server system can further generate the MR data based on the real-world image data captured by the camera of the wireless device or other camera located at the first location. The MR data can anchor a virtual object to a real-world object at the first location of the wireless device. For example, the MR data includes a virtual image of an object at a position that corresponds to or represents an actual physical position of the corresponding real-world object at the corresponding position. The MR data can also simulate the wireless device based on the parameter data, as described with respect to FIGS. 2-4. In some implementations, the real-world object represents the wireless device (e.g., the virtual image 304 of the wireless device in FIG. 6 represents a real-world wireless device, such as wireless device 208, at the first location). In some implementations, the real-world object represents an object different from the wireless device (e.g., the virtual image 602 of an object in FIG. 6 represents a real-world object at the first location).

In some implementations, the generated MR data includes features determined based on the first location and/or the second location. For example, when the wireless device is located at the first location, the generated MR data includes features associated with the first location. After the wireless device changes its position from the first location to a third location that is different from the first location the generated MR data includes features associated with the third location. The features can include features associated with the environment of the first location such as indoor features (e.g., furniture, room configurations, lighting, or windows) and outdoor features (e.g., roads, trees, water bodies, or green areas). For example, when the server system has determined that the first location is a store, the generated MR data includes an environment that corresponds to a store. In contrast, when the server system has determined that the first location is an outdoor location (e.g., a forest, a park, or a beach), the generated MR data includes an environment that corresponds to the outdoor location.

In some implementations, the features can be associated with a city or a country. For example, when the wireless device is located in New York City, the MR data can include features that are identifiable to New York City (e.g., the NYC skyline, Statue of Liberty, or Times Square). As another example, when the wireless device is located in a foreign country the MR data can include features that are identifiable to the respective foreign country. For example, when the wireless device is located in Japan, the MR data can include features that are identifiable to Japan. The features can include, for example, text, logos, and audio content in the Japanese language.

In some implementations, the MR data can further include avatar data configured to generate an avatar (e.g., the avatar 308) that virtually communicates with the user wearing the HMD device, as described with respect to FIGS. 2-4. The avatar can have an appearance and communicates in a language that is associated with the first location. For example, when the wireless device is located in Japan, the avatar can have an appearance of a Japanese person and the avatar can communicate with the user of the HMD device in Japanese.

At 708, the server system can cause the HMD device to display an immersive view (e.g., the MR view 600 in FIG. 6) to a user wearing the HMD device based on the MR data. The HMD device can display the immersive view while the wireless device is in the first location and the HMD device is in the second location.

In some implementations, when the first location can be different from the second location, the immersive view can correspond to an instance where the user wearing the HMD device has virtually teleported to the first location at which the wireless device is located at while the user is physically located at the second location. The immersive view can include customized features that are associated with the first location. In some implementations, the immersive view displayed by the HMD device is configured to provide a metaverse experience to the user wearing the HMD device. The metaverse experience can include real-time virtual interactions with spaces and/or people located across a distance from the user wearing the HMD device. For example, the metaverse experience can include interacting virtually with avatars and/or other users of the metaverse associated with the server system in real-time.

In some implementations, the MR data can further include avatar data configured to generate an avatar that represents a service representative of the repair shop. The virtual object can correspond to an object in a repair shop of a network operator associated with the telecommunications network. For example, the virtual object can correspond to a wireless device that a user has brought to the repair shop to be repaired.

As an example, the user can be a subscriber of the telecommunications network that is associated with the server system. The user may wish to have her wireless device repaired and therefore ships the wireless device to the repair shop of a network operator associated with the telecommunications network. While located physically separate from the wireless device, the user can interact with the wireless device in the metaverse. The user can put on the HMD device and launch an application associated with the telecommunications network. In response to launching the application, the server system can provide the user with an immersive computer-generated view of the repair shop that resembles the physical stores of the telecommunications network. In the computer-generated view, the user also sees a virtual image of the wireless device and can interact with the wireless device. For example, the user may wish to review an important text message or contact information that is saved on the wireless device by providing virtual user inputs on the wireless device (e.g., as described with respect to FIG. 4). As another example, the user can interact with an avatar representing a customer service representative at the repair shop. The interaction can include, for example, the avatar communicating with the user regarding the repairs done to the wireless device.

As another example, the user of the HMD device can teleport herself to a distant location to virtually interact with a friend. In such an instance, the server system can generate the MR data based on a location and parameter data received from the friend's wireless device. When the friend is holding her wireless device and is located at Times Square, the generated MR data can include an immersive view of Times Square and include either a virtual image depicting the friend or an avatar representing the friend. The user of the HMD device can interact with the friend via the metaverse experience created by the generated MR data.

Computer System

Figure 8:
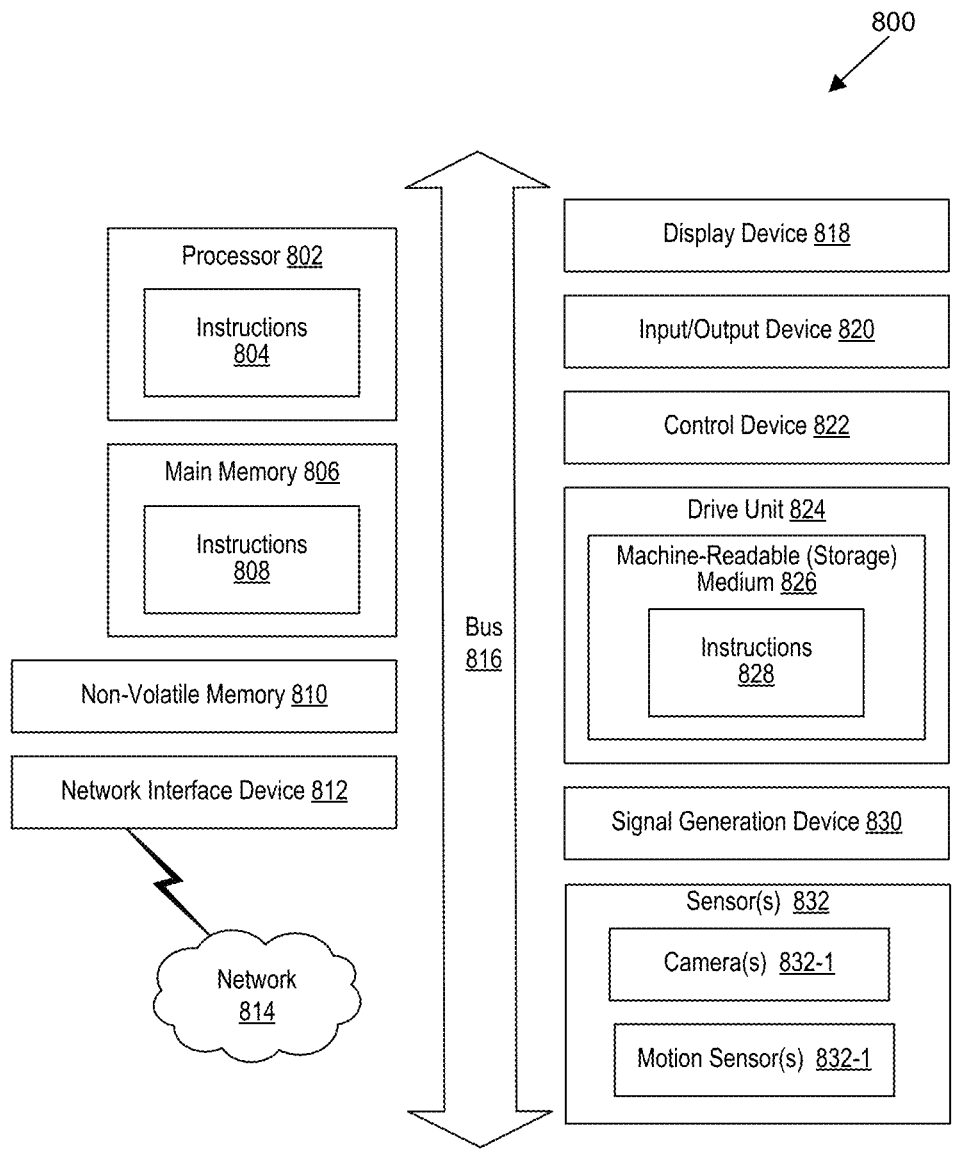
FIG. 8 is a block diagram that illustrates an example of a computer system in which at least some operations described herein can be implemented.

FIG. 8 is a block diagram that illustrates an example of a computer system 800 in which at least some operations described herein can be implemented. In some implementations, the computer system can correspond to the server system 202, the HMD device 206, and/or the wireless device 208 of systems 200 and 500 described with respect to FIGS. 2 and 5. As shown, the computer system 800 can include:

one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can further include one or more sensors 832. The one or more sensors 832 can include one or more cameras 832-1 and/or one or more motion sensors 832-2. The one or more cameras 8321-1 can be configured to capture image data (e.g., images or videos) of an environment and/or objects surrounding the computer system. For example, in implementations where the computer system 800 corresponds to a wireless device (e.g., the wireless device 208 or a computer or a tablet computer) the computer system 800 can include one or more cameras that capture image data. For example, the wireless device 208 can include a camera on the backside and the front side of the wireless device. In implementations where the computer system 800 corresponds to an HMD device (e.g., the HMD device 206) the computer system 800 can have multiple cameras on the front surface and/or side surfaces of the HMD device. The multiple cameras are configured to capture image data that represents a field of view of a user wearing the HMD device as if the user was viewing the surroundings without wearing the HMD device. The one or more motion sensors 832-2 can be configured to capture the movement of the computer system. The one or more motion sensors 832-2 can be selected from an accelerometer sensor, an orientation sensor, a light sensor, a fingerprint sensor, a Global Positioning System (GPS) sensor, a gyroscope, a microphone, and a touchscreen sensor.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., HMD devices), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system associated with a telecommunications network, the system in communication with a wireless device and a head-mounted display (HMD) device, the system comprising:
   at least one hardware processor; and
   at least one non-transitory memory storing instructions, which, when executed by the at least one hardware processor, cause the system to:
      obtain image data that depicts the wireless device while a user is wearing the HMD device,
         wherein the wireless device and the HMD device are co-located in an area of the telecommunications network while the user is wearing the HMD device,
      receive, from the wireless device, parameter data of the wireless device,
         wherein the parameter data is generated by one or more sensors of the wireless device,
      generate mixed reality data based on the image data and the parameter data,
         wherein the mixed reality data includes an immersive view of a computer-generated virtual environment including a virtual image of the wireless device, and
         wherein the virtual image depicts a real-world view of the wireless device and the virtual image of the wireless device changes based on the parameter data; and
      cause the HMD device to display the immersive view to the user wearing the HMD device based on the mixed reality data.

2. The system of claim 1, wherein the parameter data indicates orientation data generated by an orientation sensor of the wireless device or movement data generated by an accelerometer sensor of the wireless device, and wherein the system is further caused to:
   continuously generate mixed reality data that tracks an orientation or a movement of the wireless device based on the orientation data or the movement data, wherein the virtual image of the wireless device changes based on the orientation or the movement of the wireless device.

3. The system of claim 1, wherein the mixed reality data include avatar data configured to generate an avatar that virtually communicates with the user wearing the HMD device, and wherein the system is further caused to:
   generate voice audio data that simulates an oral communication from the avatar to the user wearing the HMD device; and
   cause the HMD device to simulate the oral communication based on the voice audio data to the user wearing the HMD device.

4. The system of claim 1, wherein the mixed reality data includes avatar data configured to generate an avatar that virtually communicates with the user wearing the HMD device, and wherein the system is further caused to:
receive, from the wireless device or from the HMD device, audio data including a first oral communication of a user input to the wireless device or the HMD device,
wherein the first oral communication is captured by a microphone of the wireless device or the HMD device;
generate a second oral communication in response to the first oral communication; and
cause the HMD device to simulate a natural conversation with the user wearing the HMD device based on the second oral communication.

5. The system of claim 1 further caused to:
receive, from the wireless device, the image data including an indication of a user input on the wireless device which has caused the wireless device to display a graphical user interface on the wireless device; and
in response to receiving the indication, update the virtual image of the wireless device in the mixed reality data to simulate the graphical user interface in the immersive view.

6. The system of claim 1, wherein the mixed reality data includes avatar data configured to generate an avatar that simulates a communication with the user wearing the HMD device, and wherein the system is further caused to:
send a command to the wireless device that causes the wireless device to perform a particular action, and
concurrently change the mixed reality data to simulate that the avatar of the mixed reality data is providing a virtual input on the virtual image of the wireless device that causes the particular action on the wireless device.

7. The system of claim 1, wherein the system is in communication with the wireless device and the HMD device via a common base station of the telecommunications network.

8. The system of claim 1, wherein:
the computer-generated virtual environment corresponds to a retail store of a network operator associated with the telecommunications network,
the mixed reality data further includes avatar data configured to generate an avatar that virtually communicates with the user wearing the HMD device, and
the avatar represents to a customer service representative of the retail store.

9. The system of claim 1, wherein the one or more sensors are selected from a group consisting of:
an accelerometer sensor,
an orientation sensor;
a light sensor;
a fingerprint sensor;
a Global Positioning System (GPS) sensor;
a gyroscope;
a microphone; and
a touchscreen sensor.

10. The system of claim 1 further caused to:
stream the mixed reality data to the HMD device through the wireless device.

11. The system of claim 1, wherein:
the parameter data includes data representing an orientation of the wireless device; and
the virtual image of the wireless device simulates the real-world view of the wireless device including the orientation of the wireless device.

12. The system of claim 1 further caused to:
receive, from the wireless device, real-world image data captured by a camera of the wireless device,
wherein the mixed reality data is generated based on the real-world image data.

13. The system of claim 1 wherein:
the obtained image data includes at least one real-world image of the wireless device captured by an image sensor of the HMD device, and
the mixed reality data including the virtual image of the wireless device is generated based on the at least one real-world image of the wireless device.

14. The system of claim 1, wherein obtaining the image data includes:
receiving application data from the wireless device,
wherein the application data is indicative of content displayed on the wireless device; and
generating the image data based on the parameter data of the wireless device and the application data of the wireless device,
wherein the parameter data indicates orientation data generated by an orientation sensor of the wireless device or movement data generated by an accelerometer sensor of the wireless device.

15. A method for generating mixed reality data to be displayed by a head-mounted display (HMD) device, the method comprising:
obtaining, by a system associated with a telecommunications network, image data that depicts a wireless device while a user is wearing the HMD device, wherein the system is in communication with the HMD device and the wireless device, and
wherein the wireless device and the HMD device are co-located in an area of the telecommunications network while the user is wearing the HMD device,
receiving, by the system from the wireless device, parameter data generated by one or more sensors of the wireless device,
generating mixed reality data based on the obtained image data and the parameter data,
wherein the mixed reality data includes an immersive view of a computer-generated virtual environment including a virtual image of the wireless device, and
wherein the virtual image depicts a real-world view of the wireless device and the virtual image of the wireless device changes based on the parameter data; and
causing, by the system, the HMD device to display the immersive view to the user wearing the HMD device based on the mixed reality data.

16. The method of claim 15, wherein the parameter data indicates orientation data generated by an orientation sensor of the wireless device or movement data generated by an accelerometer sensor of the wireless device, and wherein the system is further caused to:
continuously generate mixed reality data that tracks an orientation or a movement of the wireless device based on the orientation data or the movement data,
wherein the virtual image of the wireless device changes based on the orientation or the movement of the wireless device.

17. A wireless device in communication with a system associated with a telecommunications network, the wireless device comprising:
one or more sensors;
at least one hardware processor; and at least one non-transitory memory storing instructions, which, when executed by the at least one hardware processor, cause the wireless device to:
  capture, by the one or more sensors, parameter data associated with the wireless device;
  send the parameter data to the system, thereby causing the system to generate mixed reality data based partially on the parameter data,
    wherein the mixed reality data includes an immersive view of a computer-generated virtual environment including a virtual image of the wireless device, and
    wherein the virtual image depicts a real-world view of the wireless device and the virtual image of the wireless device changes based on the parameter data; and
  stream the mixed reality data to a head-mounted display (HMD) device configured to present the immersive view to a user of the wireless device,
wherein the HMD device displays a real-world view of the wireless device in the immersive view of the computer-generated virtual environment.

18. The device claim 17, wherein the one or more sensors are selected from a group consisting of:
  an accelerometer sensor;
  an orientation sensor;
  a light sensor;
  a fingerprint sensor;
  a Global Positioning System (GPS) sensor;
  a gyroscope;
  a microphone; and
  a touchscreen sensor.

19. The device of claim 17, wherein the parameter data indicates orientation data generated by an orientation sensor of the wireless device or movement data generated by an accelerometer sensor of the wireless device, and wherein the system is further caused to:
  continuously generate mixed reality data that tracks an orientation or a movement of the wireless device based on the orientation data or the movement data,
  wherein the virtual image of the wireless device changes based on the orientation or the movement of the wireless device.

* * * * *